(12) United States Patent
Dudar (10) Patent No.: US 10,094,696 B2
(45) Date of Patent: Oct. 9, 2018

(54) DETECTING VEHICLE STATE VIA FUEL LEVEL

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 15/208,648

(22) Filed: Jul. 13, 2016

(65) Prior Publication Data

US 2018/0017427 A1 Jan. 18, 2018

(51) Int. Cl.
*G01F 23/36* (2006.01)
*B60K 15/035* (2006.01)
*B60K 15/03* (2006.01)

(52) U.S. Cl.
CPC ........ *G01F 23/36* (2013.01); *B60K 15/03504* (2013.01); *B60K 15/03519* (2013.01); *B60K 2015/0319* (2013.01); *B60K 2015/03197* (2013.01); *B60K 2015/03223* (2013.01); *B60K 2015/03388* (2013.01); *B60K 2015/03514* (2013.01); *B60Y 2306/01* (2013.01); *B60Y 2400/304* (2013.01); *B60Y 2400/306* (2013.01); *B60Y 2400/3042* (2013.01)

(58) Field of Classification Search
CPC .......... G01F 23/36; B60K 2015/03388; B60K 2015/0319
See application file for complete search history.

(56) References Cited

U.S. PATENT DOCUMENTS

| 5,531,290 A | 7/1996 | Furuichi et al. |
| 7,580,782 B2 | 8/2009 | Breed et al. |
| 8,335,616 B2 | 12/2012 | Neal et al. |
| 2005/0236213 A1 | 10/2005 | Hosoya |
| 2008/0314674 A1 * | 12/2008 | Kamio ..................... B62J 27/00 180/282 |
| 2011/0178683 A1 | 7/2011 | Doerr et al. |

FOREIGN PATENT DOCUMENTS

| FR | 2811231 A1 | 1/2002 |
| GB | 2254125 A | 9/1992 |
| JP | 2006214756 A | 8/2006 |
| JP | 2010139409 A | 6/2010 |
| KR | 20110091196 A | 8/2011 |
| WO | WO 2014108219 A1 | 7/2014 |

OTHER PUBLICATIONS

UKIPO Search Report for Application No. GB1711145.1 dated Nov. 22, 2017 (4 pages).

* cited by examiner

*Primary Examiner* — Yuen H Wong
(74) *Attorney, Agent, or Firm* — Frank A. MacKenzie; Bejin Bieneman PLC (57) ABSTRACT

A method of monitoring a vehicle includes monitoring a precollision fuel level, detecting a collision event, and detecting a vehicle orientation based at least on the precollision fuel level and a postcollision fuel level. The method can be executed by a controller having a processor and a memory storing processor-executable instructions where the processor is programmed to monitor the precollision fuel level, detect the collision event, and detect the vehicle orientation based on at least a precollision fuel level and a postcollision fuel level.

20 Claims, 5 Drawing Sheets

DETECTING VEHICLE STATE VIA FUEL LEVEL

BACKGROUND

Gas-powered vehicles have a fuel system with a fuel tank, a fuel-level indicator, and a fuel pump. Some fuel systems further have an evaporative emission control system. The fuel tank stores fuel for the vehicle. The fuel tank contains the fuel pump, which draws fuel from the fuel tank to deliver to an engine, and the fuel-level indicator. The fuel-level indicator has a float, a rod, a wiper, and a variable resistor. The float is attached to an end of the rod. The rod and the wiper are fixed relative to each other and rotatably connected to the variable resistor. The float is buoyant and rests on a surface of the fuel in the fuel tank. The rod is freely rotatable relative to the variable resistor. If the float moves up or down, the rod rotates accordingly relative to the variable resistor. The wiper is positioned so that as the float moves from the top of the fuel tank to the bottom of the fuel tank, the rod rotates the wiper from one end of the variable resistor to the other end of the variable resistor. The wiper is electrically connected to a fuel gauge and to the variable resistor. The variable resistor is electrically connected to the wiper and to ground. As the wiper changes position relative to the variable resistor, an electrical resistance provided by the variable resistor changes. The fuel gauge detects a level of current flowing through the wiper and the variable resistor to ground. The current changes as the resistance changes, and the fuel gauge translates the current to a fuel level.

DETAILED DESCRIPTION

With reference to the Figures, wherein like numerals indicate like parts throughout the several views, a controller 31 (which may be a standalone device or embedded in, e.g., a vehicle controller 32, a restraint control module 80, or a powertrain control module 82) includes a processor and a memory storing processor-executable instructions. The processor is programmed to monitor a fuel level, detect a collision event, and detect a vehicle state based on at least a precollision fuel level and a postcollision fuel level.

If a vehicle 30 is in a collision, there is a possibility that the vehicle 30 partially or completely rolls over, and the roll orientation of the vehicle 30 is useful for first responders to know before arriving at the scene of the collision, as discussed below. Some vehicles 30 are equipped with rollover sensors 86 that detect if the vehicle 30 has or will imminently roll over. However, some vehicles 30 may not be equipped with rollover sensors 86, or the rollover sensors 86 or controllers receiving information from the rollover sensors 86 may become damaged during the collision. Occupants of the vehicle 30 may report the roll orientation to first responders, but the occupants may be unconscious or otherwise unable to communicate with first responders before arrival. Furthermore, if the vehicle 30 is autonomous, the vehicle 30 may have no occupants.

Secondly, if the vehicle 30 is in a collision, there is a possibility that the vehicle is leaking fuel into the environment, and the risk of such a fuel leak is also useful for first responders to know before arriving at the scene of the collision. If the vehicle 30 leaks fuel, occupants may smell the fuel and report the leak to first responders. However, the occupants may be unconscious, incapacitated, or otherwise unable to communicate with first responders before arrival, and if the vehicle 30 is autonomous, the vehicle 30 may have no occupants.

The controller 31 generates useful information for first responders or others who may respond to a collision of the vehicle 30. The programming of the controller 31 provides redundancy relative to a rollover sensor 86 by operating when the rollover sensor 86 is inoperable or when the vehicle 30 is not equipped with a rollover sensor 86. The programming of the controller 31 also provides redundancy to information reporting by occupants of the vehicle 30 in case the occupants are unconscious, incapacitated, or otherwise unable to communicate with first responders, or if the vehicle 30 has no occupants.

The vehicle 30 may be an autonomous vehicle. The vehicle controller 32, sometimes referred to as the "virtual driver," may be capable of operating the vehicle 30 independently of the intervention of a human driver, to a greater or a lesser degree. The vehicle controller 32 may be programmed to operate the engine, braking system, steering, and/or other vehicle systems.

Figure 1:
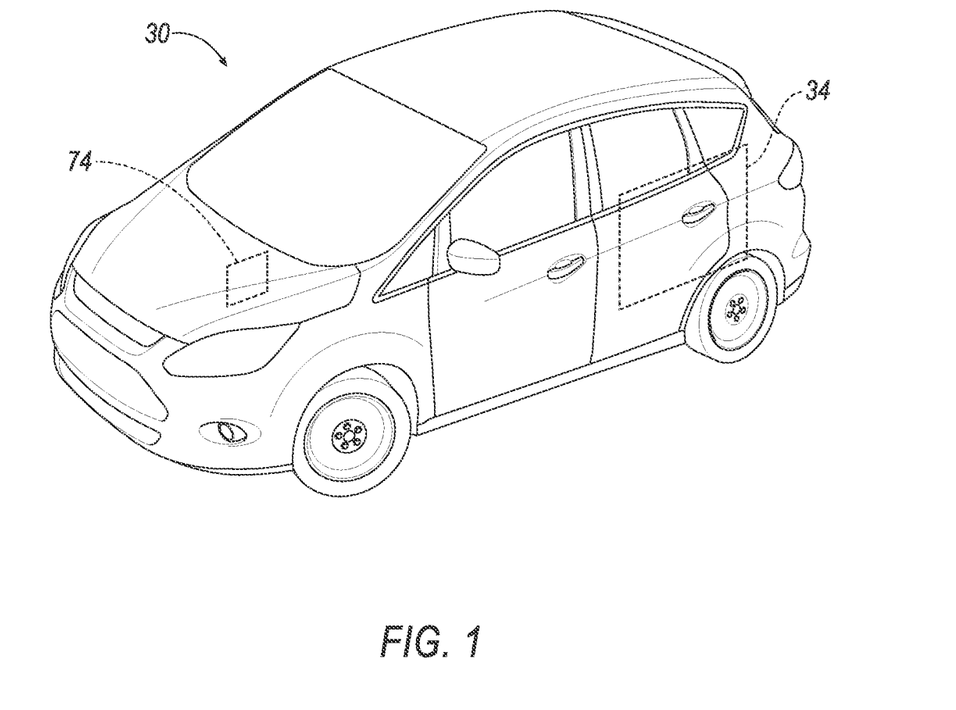
FIG. 1 is a perspective view of a vehicle.
Figure 2:
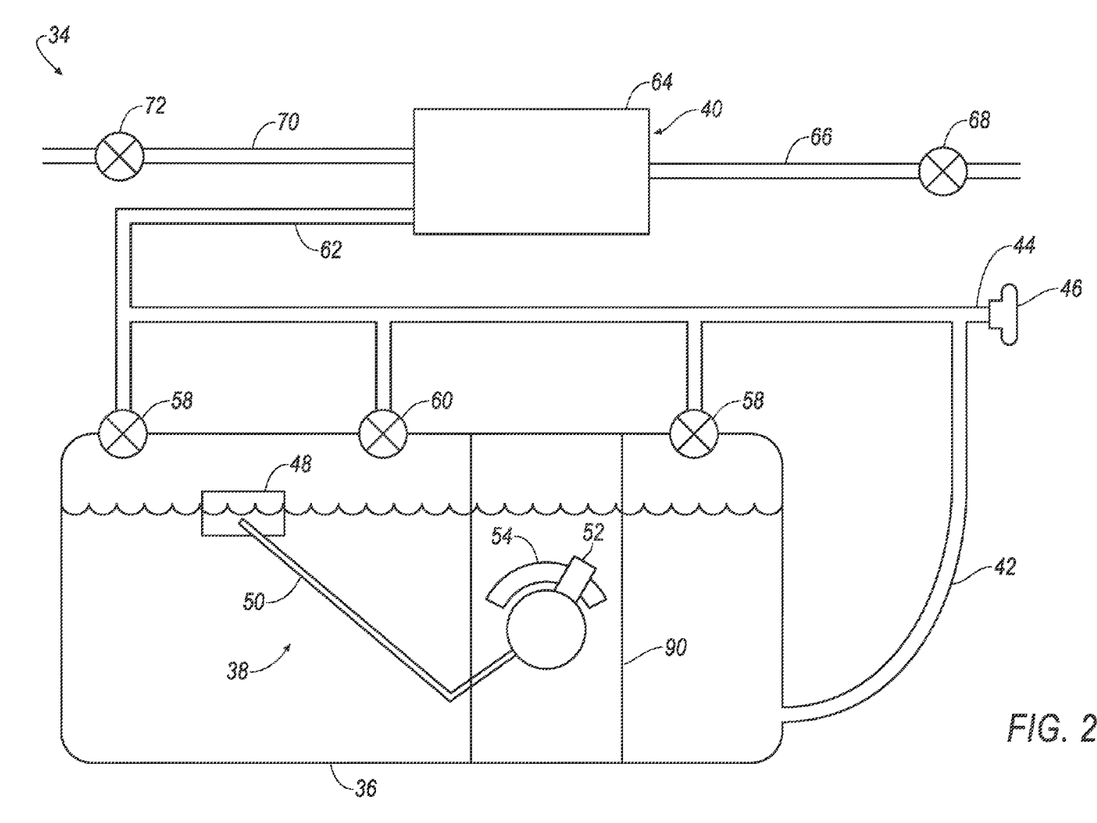
FIG. 2 is a fuel system of the vehicle of FIG. 1 in a right-side-up orientation.

With reference to FIGS. 1 and 2, the vehicle 30 includes a fuel system 34. The fuel system 34 includes a fuel tank 36, a fuel-level indicator 38, a fuel pump 90, and an evaporative emission control system 40.

The fuel tank 36 stores fuel for the vehicle 30. The fuel tank 36 may receive fuel via a filler neck 42 from an inlet 44 coverable by a gas cap 46. The fuel tank 36 contains the fuel pump 90, which draws fuel from the fuel tank 36 to deliver to an engine (not shown).

The fuel tank 36 contains the fuel-level indicator 38. The fuel tank 36 may include a single chamber or may be, for example, a saddle tank. If the fuel tank 36 is a saddle tank, the fuel tank 36 includes two chambers for storing fuel fluidly connected at the tops of the chambers. A saddle-tank style of fuel tank 36 may include pumps to move fuel between the chambers and two fuel-level indicators 38, one for each chamber.

The fuel-level indicator 38 includes a float 48, a rod 50, a wiper 52, and a variable resistor 54. The float 48 is attached to an end of the rod 50. The rod 50 and the wiper 52 are fixed relative to each other and rotatably connected to the variable resistor 54.

The float 48 is buoyant and rests on a surface of the fuel in the fuel tank 36. If the fuel tank 36 is full of fuel, the float 48 will rest at the vertically topmost portion of the fuel tank 36. If the fuel tank 36 is empty, the float 48 will rest at the vertically bottommost portion of the fuel tank 36.

The float 48 is attached to the end of the rod 50. The rod 50 is freely rotatable relative to the variable resistor 54. If the float 48 moves up or down, the rod 50 rotates accordingly relative to the variable resistor 54.

The wiper 52 is fixed relative to the rod 50 and rotates with the rod 50 relative to the variable resistor 54. The wiper 52 is positioned so that as the float 48 moves from the top of the fuel tank 36 to the bottom of the fuel tank 36, the rod 50 rotates the wiper 52 from one end of the variable resistor 54 to the other end of the variable resistor 54. The wiper 52 is electrically connected to a fuel gauge 56 and to the variable resistor 54.

The variable resistor 54 is fixed relative to the fuel tank 36. The variable resistor 54 is electrically connected to the wiper 52 and to ground. As the wiper 52 changes position relative to the variable resistor 54, an electrical resistance provided by the variable resistor 54 changes. The fuel gauge 56 detects a level of current flowing through the wiper 52 and the variable resistor 54 to ground. The current changes as the resistance changes, and the fuel gauge 56 translates the current to a fuel level.

In operation, if the vehicle 30 is right-side up, as the vehicle 30 uses fuel, the float 48 moves downward (i.e., in the direction of gravity) with the surface of the fuel. The rod 50 and the wiper 52 rotate relative to the variable resistor 54, changing the position of the wiper 52 against the variable resistor 54. As the wiper 52 moves across the variable resistor 54, the level of current flowing from the fuel gauge 56 through the wiper 52 and the variable resistor 54 to ground changes. The fuel gauge 56 translates the level of current into the fuel level.

The evaporative emission control system 40, called the EVAP system 40, draws evaporated fuel from the fuel tank 36, stores evaporated fuel, and supplies evaporated fuel to the engine. The evaporated fuel may be released through venting valves at a top of the fuel tank 36, such as grade vent valves 58 and fuel-limit vent valves 60. The evaporated fuel may travel through a load line 62 to a canister 64, which stores the evaporated fuel. The canister 64 may, for example, contain charcoal, or any other substance suitable for storing evaporated fuel. The canister 64 is connected through a vent line 66 and a canister vent valve 68 to the external environment. The canister vent valve 68 may draw air from the environment to the canister 64. The canister 64 is connected through a purge line 70 and a canister purge valve 72 to the engine. The canister 64 may discharge air and evaporated fuel through the canister purge valve 72 to be used by the engine. If the vehicle 30 rolls upside down following a collision, fuel may leak through the EVAP system 40.

Figure 3:
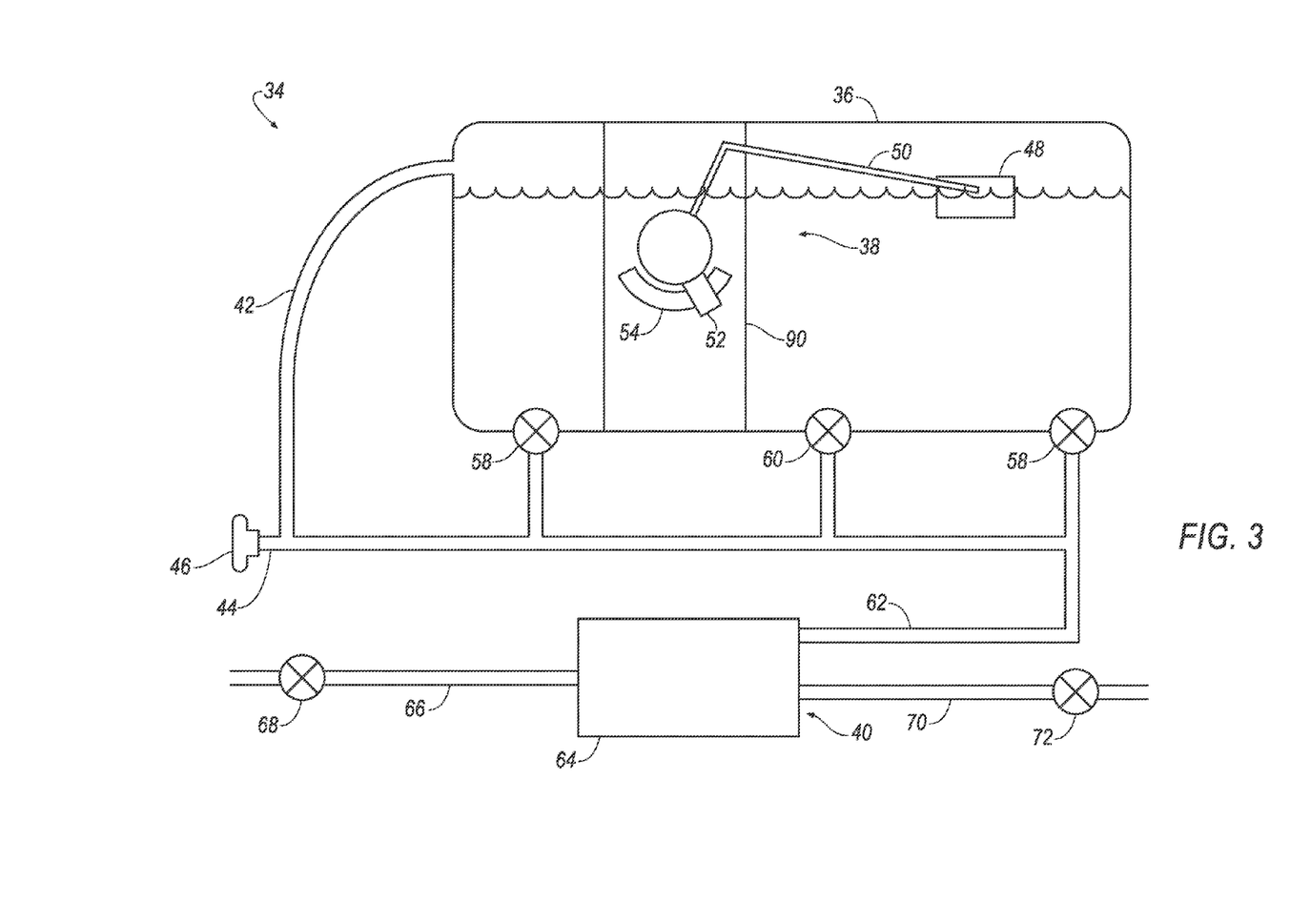
FIG. 3 is the fuel system of the vehicle of FIG. 1 in an upside-down orientation.

With reference to FIG. 3, the vehicle 30 includes a control system 74. The control system 74 may include a communications network 76 connecting a collision sensor 78, the vehicle controller 32, the restraint control module 80, the powertrain control module 82, the fuel gauge 56, and a transmitter 84. The control system 74 may also include a rollover sensor 86 in communication with the restraint control module 80 and the fuel-level indicator 38 in communication with the fuel gauge 56.

The collision sensor 78 may be in communication with the vehicle controller 32, the restraint control module 80, and/or the powertrain control module 82. The collision sensor 78 is programmed to detect an impact to the vehicle 30. The collision sensor 78 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The collision sensor 78 may be located at numerous points in or on the vehicle 30.

The vehicle controller 32 is implemented via circuits, chips, or other electronic components. The vehicle controller 32, therefore, may be a microprocessor-based controller including a processor 32a, memory 32b, etc. The memory 32b of the vehicle controller 32 may include memory for electronically storing instructions executable by the processor 32a as well as for electronically storing data and/or databases.

The restraint control module 80 is a microprocessor-based controller. The restraint control module 80 may include a processor 80a, memory 80b, etc. The memory 80b of the restraint control module 80 may include memory for storing instructions executable by the processor 80a as well as for electronically storing data and/or databases. The restraint control module 80 may be in communication with and may control airbags in the vehicle 30, among other functions.

The rollover sensor 86 may be in direct communication with the restraint control module 80 or may be connected to the communications network 76. The rollover sensor 86 is adapted to detect an orientation of or change in orientation of the vehicle 30 relative to the earth, for example, roll or pitch of the vehicle 30. The rollover sensor 86 may be, for example, an angular rate sensor such as a gyroscope or any other suitable sensor.

The powertrain control module 82 is a microprocessor-based controller. The powertrain control module 82 may include a processor 82a, memory 82b, etc. The memory 82b of the powertrain control module 82 may include memory for storing instructions executable by the processor 82a as well as for electronically storing data and/or databases. The powertrain control module 82 may be in communication with and may control the engine and/or a transmission of the vehicle 30, among other functions.

The controller 31 may be a standalone device or may be embedded in one or more of the vehicle controller 32, the restraint control module 80, and the powertrain control module 82. For example, in FIG. 3, the controller 31 is depicted as embedded in the powertrain control module 82. The controller 31 may rely on one or more of the memories 32b, 80b, 82b to electronically store instructions executable by one or more of the processors 32a, 80a, 82, as well as to electronically store data and/or databases. Alternatively, the controller 31 may be a physically separate module including a separate processor, memory, etc.

The control system 74 may transmit signals through the communications network 76, which may be a controller area network (CAN) bus, Ethernet, Local Interconnect Network (LIN), and/or by any other wired or wireless communications network.

The transmitter 84 may be connected to the communications network 76. The transmitter 84 may be adapted to transmit signals wirelessly through any suitable wireless communication protocol, such as Bluetooth, WiFi, 802.11a/b/g, radio, etc. The transmitter 84 may be adapted to communicate with a remote server 88, that is, a server distinct and spaced from the vehicle 30. The remote server 88 may be located outside the vehicle 30. For example, the remote server 88 may be associated with other vehicles (e.g., V2V communications), infrastructure components (e.g., V2I communications), emergency responders, towing companies, etc.

Figure 4:
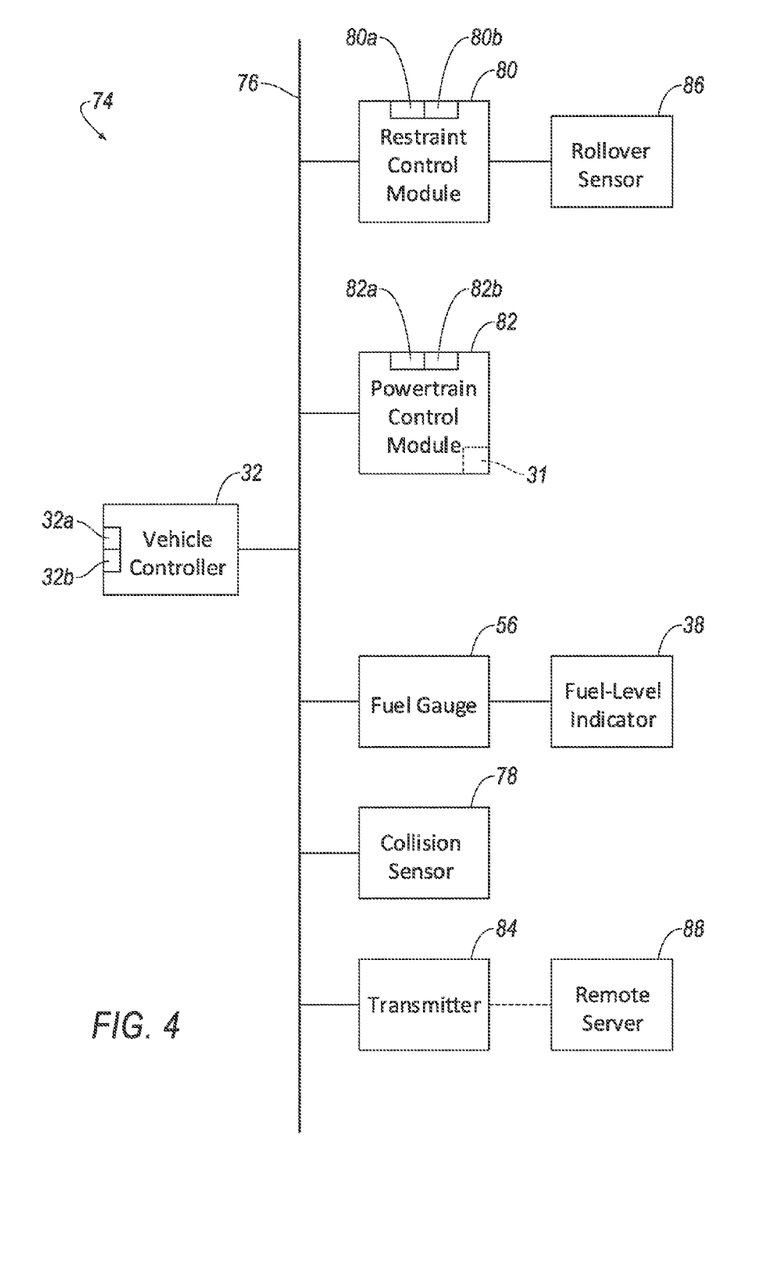
FIG. 4 is a block diagram of a control system of the vehicle of FIG. 1.
Figure 5:
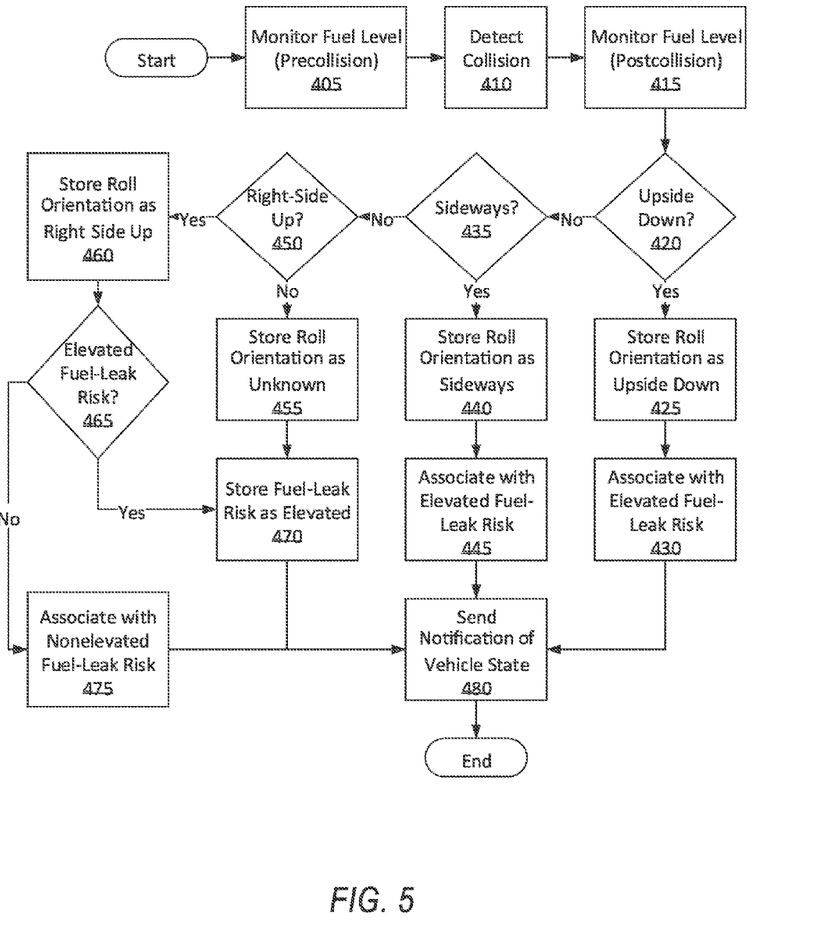
FIG. 5 is a process flow diagram of a process for monitoring a vehicle orientation of the vehicle of FIG. 1.

FIG. 4 is a process flow diagram illustrating an exemplary process 400 for monitoring a vehicle state of the vehicle 30. The vehicle state may be a roll orientation (e.g., right-side up, upside down, sideways), a fuel-leak risk (e.g., elevated fuel-leak risk, nonelevated fuel-leak risk), a combination of roll orientation and fuel-leak risk, or another characteristic of the vehicle 30. The process 400 is carried out by the controller 31. The controller 31 may be embedded in the vehicle controller 32, the powertrain control module 82, the restraint control module 80, and/or another controller of the vehicle 30. Alternatively or additionally, the controller 31 may be embedded in two of the controllers 32, 80, 82, one of which may be programmed to carry out the process 400, and another of which may be programmed to carry out the process 400 if the one of the controllers 32, 80, 82 becomes damaged or unresponsive. Further alternatively or additionally, the process 400 may be carried out as a backup to detection of the roll orientation by the rollover sensor 86 in case the rollover sensor 86 or the restraint control module 80 becomes damaged or unresponsive, or the process 400 may be carried out in addition to detection of the roll orientation by the rollover sensor 86.

The process 400 begins in a block 405, in which the controller 31 monitors the precollision fuel level. The fuel gauge 56 may transmit the fuel level through the communications network 76 to the controller 31. If the fuel tank 36 is a saddle tank, the controller 31 may receive fuel-level readings from at least two fuel-level indicators 38. The controller 31 stores the fuel level as a precollision fuel level.

Next, in a block 410, the controller 31 detects a collision event. The collision sensor 78 may detect the collision event and transmit a signal representing that the collision has occurred through the communications network 76 to the controller 31. The controller 31 may detect the collision event in response to receiving the signal from the collision sensor 78.

Next, in a block 415, the controller 31 monitors the postcollision fuel level. For instance, the controller 31 may receive signals output by the fuel gauge 56 representing the fuel level after the collision is detected. The controller 31 stores the fuel level as a postcollision fuel level in one or more of the memories 32b, 80b, 82b.

The text below accompanying blocks 420 through 475 describe detecting the vehicle orientation based at least on the precollision fuel level and the postcollision fuel level.

Next, in a decision block 420, the controller 31 determines whether the vehicle 30 is in an upside-down orientation. The controller 31 may detect the upside-down orientation when the postcollision fuel level is equal to a difference of a fuel-tank capacity relative to the precollision fuel level. If the vehicle 30 has a roll orientation of upside down, the fuel is resting on what would otherwise be the top of the fuel tank 36, which is directed downward. The float 48 occupies a complementary position relative to the position of the float 48 before the collision. For example, if the precollision fuel level is 75% and the vehicle 30 takes on an upside-down orientation, the fuel-level indicator 38 will indicate the postcollision fuel level as 25% because the float 48 is volumetrically 75% from the top of the fuel tank 36, as shown in FIG. 2. If the postcollision fuel level is equal to the difference of the fuel-tank capacity relative to the precollision fuel level, the controller 32, 80, 82 stores the roll orientation of the vehicle 30 as upside down, in a block 425. If the postcollision fuel level is not equal to the difference of the fuel-tank capacity relative to the precollision fuel level, the process 400 proceeds to a decision block 435.

Additionally, the controller 31 may confirm an upside-down orientation by checking one or more levels of other fluids stored in the vehicle 30, for example, windshield-washer fluid, oil, urea for diesel engines, etc. If a postcollision fluid level is equal to a difference of a fluid-tank capacity relative to a precollision fluid level, then the controller 31 has greater confidence that the vehicle 30 has a roll orientation of upside down. If the postcollision fluid level is not equal to the fluid-tank capacity, then the controller 31 has less confidence that the vehicle 30 has a roll orientation of upside-down.

After the block 425, in a block 430, the upside-down orientation is associated with an elevated fuel-leak risk. The fuel-leak risk is stored as elevated. The process 400 may proceed from the block 425 to a block 480.

If the controller 31 determines that the roll orientation is not upside down in the decision block 420, next, in the decision block 435, the controller 31 may determine whether the vehicle 30 is in a sideways orientation. The controller 31 may detect the sideways orientation when the postcollision fuel level is equal to a stored value corresponding to the precollision fuel level. In other words, one of the memories 32b, 80b, 82b may have a table or the like associating possible precollision fuel levels with postcollision fuel levels if the vehicle 30 were in a sideways orientation. If the actual value of the postcollision fuel level matches the stored value associated with the precollision fuel level, then the controller 31 concludes that the vehicle 30 has a roll orientation of sideways. The stored values corresponding to various precollision fuel levels may be determined by a system designer by experiments, computer simulations, or other methods. If the controller 31 determines that the roll orientation of the vehicle 30 is sideways, the controller 31 stores the roll orientation as sideways, in a block 440. If the controller 31 determines that the roll orientation is not sideways, the process 400 proceeds to a decision block 450.

After the block 440, in a block 445, the sideways orientation is associated with an elevated fuel-leak risk. The fuel-leak risk is stored as elevated. The process 400 may proceed from the block 440 to the block 480.

If the controller 31 determines that the roll orientation is not sideways in the decision block 435, next, in the decision block 450, the controller 31 determines whether the vehicle 30 is in the right-side-up orientation. The controller 31 detect the right-side-up orientation when the postcollision fuel level is approximately equal to (e.g., within 1% of) the precollision fuel level. If the controller 31 determines that the roll orientation is right-side up, the controller 31 stores the roll orientation as right-side up, in a block 460. If the controller 31 determines that the roll orientation is not right-side up, the controller 31 stores the roll orientation as unknown, in a block 455, and then the controller 31 stores the fuel-leak risk as elevated, in a block 470.

After the block 460, in a decision block 465, the controller 31 detects an elevated fuel-leak risk when the postcollision fuel level is decreasing. The controller 31 may check for monotonic decrease, that is, when the postcollision fuel level decreases without any increase, in order to eliminate false positives from sloshing fuel, which may appear as alternating increases and decreases. Alternatively, the controller 31 may measure a net decrease over a preset time, or the controller 31 may wait a preset time after the collision before using measures of the postcollision fuel level. If the controller 31 detects an elevated fuel-leak risk, the controller 31 stores the fuel-leak risk as elevated, in the block 470. If the controller 31 does not detect an elevated fuel-leak risk, the right-side-up orientation is associated with a nonelevated fuel-leak risk, in a block 475, and the fuel-leak risk is stored as nonelevated.

After the blocks 430, 445, 470, or 475, in the block 480, the controller 31 transmits a notification of the vehicle orientation to the remote server 88. The controller 31 instructs the transmitter 84 to send a V2V, V2I, or other type of message including the vehicle orientation to an available remote server 88. The vehicle orientation may be accompanied by the fuel-leak risk. If the remote server 88 is associated with first responders, the notification may allow the first responders to bring rescue and/or salvage equipment appropriate to the roll orientation of the vehicle, for example, an appropriate type of tow truck, and may allow the first responders to adjust their level of precautions based on fuel-leak risk.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of monitoring a vehicle comprising:
monitoring, by a controller of the vehicle, a precollision fuel level;
detecting, by the controller, a collision event;
detecting, by the controller, a vehicle roll orientation based at least on the precollision fuel level and a postcollision fuel level and independent of an output from a rollover sensor; and
controlling, by the controller, at least one operational component of the vehicle based on the detected vehicle roll orientation and the detected collision event.

2. The method of claim 1, further comprising transmitting a notification of the vehicle state to a remote server.

3. The method of claim 1, wherein detecting the vehicle orientation includes detecting an upside-down orientation when the postcollision fuel level is equal to a difference of a fuel-tank capacity relative to the precollision fuel level.

4. The method of claim 3, wherein the upside-down orientation is associated with an elevated fuel-leak risk.

5. The method of claim 1, wherein detecting the vehicle orientation includes detecting a sideways orientation when the postcollision fuel level is equal to a stored value corresponding to the precollision fuel level.

6. The method of claim 1, wherein detecting the vehicle orientation includes detecting a right-side-up orientation when the postcollision fuel level is equal to the precollision fuel level.

7. The method of claim 1, wherein detecting the vehicle orientation includes detecting an elevated fuel-leak risk when the postcollision fuel level is decreasing.

8. The method of claim 1, further comprising receiving fuel-level readings from at least two fuel-level indicators.

9. The method of claim 1, wherein the controller is a vehicle controller, the method further comprising, by the controller, operating an engine, braking system, and steering of the vehicle.

10. The method of claim 1, wherein the controller is a restraint control module, the method further comprising, by the controller, controlling airbags of the vehicle.

11. A controller comprising a processor and a memory storing processor-executable instructions, wherein the processor is programmed to:
monitor a precollision fuel level;
detect a collision event;
detect a vehicle roll orientation based on at least a precollision fuel level and a postcollision fuel level and independent of an output from a rollover sensor; and
control at least one operational component of the vehicle based on the detected vehicle roll orientation and the detected collision event.

12. The controller of claim 11, wherein the processor is further programmed to transmit a notification of the vehicle orientation to a remote server.

13. The controller of claim 11, wherein the programming to detect the vehicle orientation includes programming to detect an upside-down orientation when the postcollision fuel level is equal to a difference of a fuel-tank capacity relative to the precollision fuel level.

14. The controller of claim 13, wherein the upside-down orientation is associated with an elevated fuel-leak risk.

15. The controller of claim 11, wherein the programming to detect the vehicle orientation includes programming to detect a sideways orientation when the postcollision fuel level is equal to a stored value corresponding to the precollision fuel level.

16. The controller of claim 11, wherein the programming to detect the vehicle orientation includes programming to detect a right-side-up orientation when the postcollision fuel level is equal to the precollision fuel level.

17. The controller of claim 11, wherein the programming to detect the vehicle orientation includes programming to detect an elevated fuel-leak risk when the postcollision fuel level is decreasing.

18. The controller of claim 11, wherein the processor is further programmed to receive fuel-level readings from at least two fuel-level indicators.

19. The controller of claim 11, wherein the processor is further programmed to operate an engine, braking system, and steering.

20. The controller of claim 11, wherein the processor is further programmed to control airbags of the vehicle.

* * * * *